March 31, 1959  W. MEYER  2,879,634
PHOTOFLASH LAMP MANUFACTURE
Filed April 8, 1958
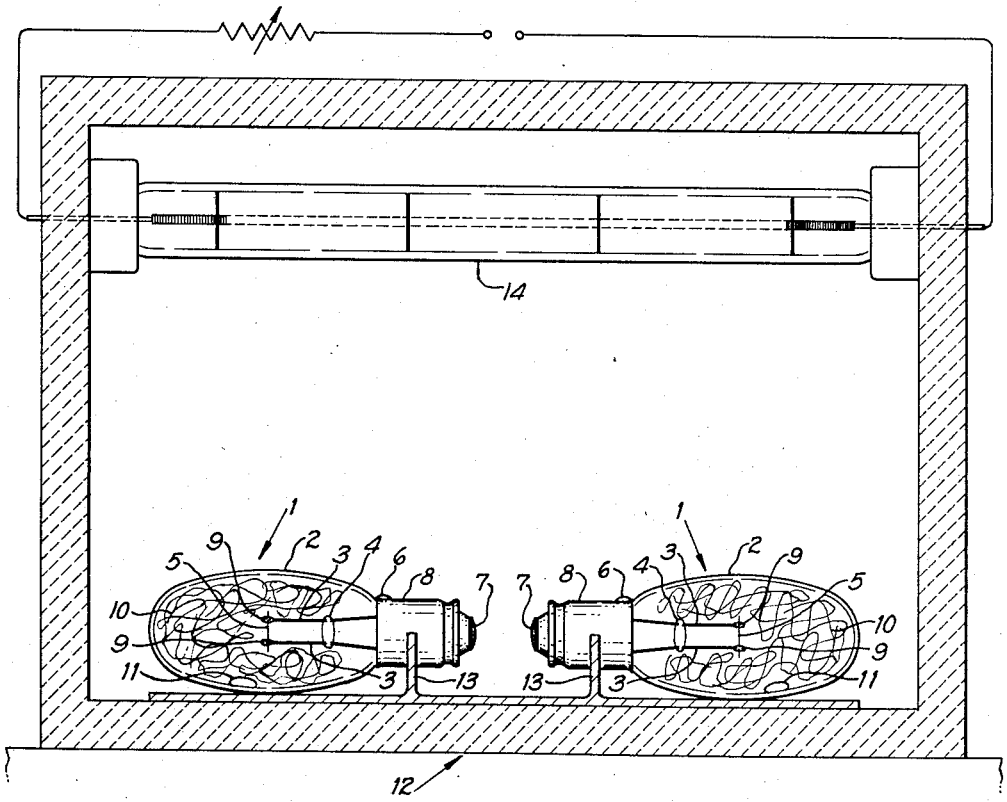
Inventor:
Wilfried Meyer,
by Andrew J. Bootz
His Attorney.

2,879,634
Patented Mar. 31, 1959

2,879,634

PHOTOFLASH LAMP MANUFACTURE

Wilfried Meyer, Berlin-Charlottenburg, Germany, assignor to Patent-Treuhand-Gesellschaft für elektrische Gluhlampen m. b. H. (Patent Fiduciary Company for Electric Incandescent Lamps Ltd.), a Germany company Application April 8, 1958, Serial No. 727,191

Claims priority, application Germany April 12, 1957

6 Claims. (Cl. 53—25)

This invention relates to the manufacture of photoflash lamps, and, more particularly, to a method of producing oxygen within photoflash lamps.

The total light output of electric photoflash lamps employing actinic material such as shredded foil as the combustible material and a combustion supporting gas such as oxygen is dependent upon the weight of the actinic material and the amount of oxygen present in the photoflash lamp. By increasing the weight of oxygen and the weight of the actinic material in the photoflash lamp substantial gains in total light output can be realized.

In manufacture, it has been customary to evacuate the glass bulb through an exhaust tube, fill the bulb with oxygen, and then tip off the bulb by a fused seal. To increase the weight of oxygen present in the photoflash lamp, the lamp may be filled with oxygen during manufacture to a pressure somewhat greater than existing atmospheric pressure. The usual methods of fabricating sealed glass bulbs are difficult to use to accomplish the present purposes, because difficulty as been experienced in tipping off the bulb with above atmospheric gas pressure therein.

Also, it is known that certain solid oxygen liberating substances can be placed within the lamp envelope so as to liberate oxygen to supplement the gaseous filling under proper conditions of reaction within the lamp envelope, for example, U.S. Patent 2,325,667—de Boer. In this way a greater quantity of oxygen is made available for the reaction without a corresponding increase in the pressure generated within the envelope prior to the tipping off operation. Materials containing oxygen in chemically combined form capable of releasing free oxygen which have been suggested include metallic oxides, peroxides, chlorates, perchlorates, certain salts, and even organic peroxide; specifically, barium peroxide will produce oxygen under proper conditions of reaction within the lamp envelope. Such an oxygen-containing compound can be placed in a predetermined amount in a photoflash lamp which may be filled with oxygen if desired, preferably, but not necessarily, of below atmospheric pressure, and after the lamp has been tipped, the oxygen-containing compound is caused to liberate free oxygen to supplement the oxygen filling by the chemical decomposition of the materials within the lamp. The desired additional quantity of oxygen is developed by heating the oxygen-containing compound from outside the flash lamp.

However, it has also been found that if certain compositions, for example, barium peroxide, are used as the oxygen-liberating substance to generate the supplemental oxygen within the lamp, the oxygen which is split up at the beginning of heating is again partly absorbed by the residue on cooling. In this way the quantity of oxygen in the lamp bulb decreases upon cooling so that the desired increase in light output is not obtained to the expected extent.

Accordingly, the present invention relates to a method of overcoming this difficulty in preventing the residue from creating a back reaction with the liberated oxygen.

It is an object of the present invention to provide an improved method for producing oxygen within photoflash lamp envelopes.

Another object of the invention is to provide an improved method of filling photoflash lamps with an increased weight of oxygen therein.

Briefly stated, in accordance with the invention, in the manufacture of a photoflash lamp according to the above described method, the reversible back reaction of the liberated oxygen with the residue of the oxygen-containing substance is prevented by mixing within the lamp envelope a compound which chemically combines with the residue and thereby prevents the back reaction.

Further objects and advantages of our invention will become apparent as the following description proceeds and the features of novelty which characterize the invention will be pointed out with particularity in the claims annexed to and forming a part of this specification. The nature of the invention will best be understood when described in connection with the accompanying drawing, which illustrates one method of heating a flash lamp of the type herein described to liberate the oxygen.

Referring to the drawing, a flash lamp shown generally at 1 comprises a bulb or envelope 2 of glass or other suitable light-transmitting material having positioned therein ignition means comprising a pair of lead-in wires 3, 3 tied together by a glass bead 4 and connected at their inner end to the opposite end of a filament 5 of tungsten or other suitable wire. The outer ends of said leads 3, 3 are connected respectively to the shell contact 6 and center contact 7 of the base 8. The inner ends or tips of the lead-in wires 3, 3 are provided with small beads of coatings 9, 9 of a suitable primer of fulminating material such as, for example, a mixture of zirconium, magnesium and potassium perchlorate powders bonded together by a suitable binder such as nitrocellulose. Disposed within the bulb 2 and around the filament 5 and primer beads 9, 9 so as to be within effective range thereof, is a charge of readily combustible actinic material 10. In the lamp illustrated, the actinic material 10 comprises a loose filling of shredded combustible foil composition, such as aluminum, magnesium or alloys thereof. The bulb 1 further contains a gas filling such as oxygen, at a suitable pressure.

In manufacture, the lamp is filled with actinic material and the ignition means are assembled therewith. According to the invention, an oxygen-liberating substance consisting essentially of an oxygen-containing compound and a compound which will combine chemically with the residue of the oxygen-containing compound after release of the oxygen is inserted into the lamp. The lamp may be gas filled with oxygen before or after the insertion of the oxygen-liberating composition. The lamp bulb is then tipped in any known manner to hermetically seal the lamp; the base may then be assembled with the lamp.

The oxygen-liberating substance is heated so as to cause decomposition of the oxygen-containing compound and liberation of free oxygen. This heating may be performed before or after assembly of the lamp with its base. The heating may be conducted in any desired manner, for example, a tipped lamp containing a base may be inserted in a conventional furnace 12, the lamp being held in place on bracket 13. The furnace 12 is then heated as, for example, by an electric quartz heat lamp 14 to a temperature sufficient to liberate the oxygen. By way of example, but not by way of limitation, barium peroxide is a compound containing oxygen in chemically combined form releasable in the form of free oxygen and found to work satisfactorily under the conditions existing within the bulb. It has been found that when barium peroxide has been heated for the production of oxygen within a photoflash lamp, at least part of the oxygen produced upon heating is partly absorbed by the residue of the barium peroxide upon cooling thereof. According to the invention, the addition of a compound which combines with the residue, such as copper sulphate, to the barium peroxide produces a substance 11 wherein the back reaction will not occur. Conversion of barium peroxide to free oxygen takes place in the presence of copper sulphate according to the $$BaO_2 + CuSO_4 \rightarrow BaSO_4 + CuO + \tfrac{1}{2}O_2$$

The stoichiometric proportion of mixed barium peroxide and copper sulphate then is about 1:1 molar ratio.

A flash bulb having a volume of 9 cm.³ can be provided in this manner with a bead of oxygen-liberating substance according to the present invention having about 76 mg. of barium peroxide and 72 mg. of anhydrous copper sulphate. Under these conditions the quantity of actinic material contained within the bulb may be about 18 mg. The bulb is filled in the usual manner to a pressure of 660 mm. Hg with oxygen and is then tipped. From the barium peroxide copper sulphate bead, oxygen is liberated by heating whereby the pressure increases to about 1060 mm. Hg. As compared to a similar bulb containing 14 mg. of actinic material filled to a pressure of 660 mm. Hg with oxygen, the lamp according to the present invention shows an increase in light output of about 50%.

Thus, where barium peroxide is used for the additional production of oxygen within the flash lamp, any reversible back reaction of the residue from the barium peroxide and free oxygen occurring on cooling may be prevented. The additional oxygen developed in the photoflash lamp is, consequently, at disposal for combustion of actinic material.

Other compositions are quite suitable as additions to the barium peroxide for prevention of the reversible back reaction, for example, sulphates of nickel, cobalt, calcium and the like; silver nitrate; and acid oxides, as, for instance, molybdenum trioxide, tungsten trioxide, vanadium pentoxide or silicon dioxide. These acid oxides form salts with the barium oxide developed from the barium peroxide on heating so that no free barium oxide is present which may reduce the quantity of oxygen present in the lamp bulb.

While modifications may occur to those skilled in the art, the invention is to be limited only by the claims annexed to and forming a part of this specification.

What I claim as new and desire to secure by Letters Patent of the United States is:

1. The method of producing oxygen within a photoflash lamp containing an actinic material and ignition means therein for igniting said actinic material, comprising the steps of inserting into the said lamp an oxygen-liberating substance consisting essentially of an oxygen-containing compound and a compound which will combine chemically with the residue of the oxygen-containing compound, hermetically sealing said envelope, and heating the said substance so as to cause it to liberate oxygen.

2. The method of producing oxygen within a photoflash lamp containing an actinic material and ignition means therein for igniting said actinic material, comprising the steps of inserting into said lamp an oxygen-liberating substance consisting essentially of an oxygen-containing compound and a compound which will combine chemically with the residue of the oxygen-containing compound, filling said envelope with oxygen, hermetically sealing said envelope, and heating the said substance so as to cause it to liberate oxygen.

3. The method of producing oxygen within a photoflash lamp containing an actinic material and ignition means therein for igniting said actinic material, comprising the steps of inserting into said lamp an oxygen-liberating substance consisting essentially of barium peroxide and copper sulphate to combine chemically with the residue of the barium peroxide after liberation of oxygen, filling said envelope with oxygen, hermetically sealing said envelope, and heating the said barium peroxide so as to cause it to liberate oxygen.

4. The method of producing oxygen within a photoflash lamp according to claim 3 wherein the mole ratio of barium peroxide to copper sulphate is about 1:1.

5. The method of producing oxygen within a photoflash lamp containing an actinic material and ignition means therein for igniting said actinic material, comprising the steps of inserting into said lamp an oxygen-liberating substance consisting essentially of barium peroxide and calcium sulphate to combine chemically with the residue of the barium peroxide after liberation of oxygen, filling said envelope with oxygen, hermetically sealing said envelope, and heating the said barium peroxide so as to cause it to liberate oxygen.

6. The method of producing oxygen within a photoflash lamp containing an actinic material and ignition means therein for igniting said actinic material, comprising the steps of inserting into said lamp an oxygen-liberating substance consisting essentially of barium peroxide and silver nitrate to chemically combine with the residue of the barium peroxide after liberation of oxygen, filling said envelope with oxygen, hermetically sealing said envelope, and heating the said barium peroxide so as to cause it to liberate oxygen.

References Cited in the file of this patent

UNITED STATES PATENTS 2,816,406    Eppig ---------------- Dec. 17, 1957